United States Patent
Cleveland et al.

(10) Patent No.: US 7,315,324 B2
(45) Date of Patent: Jan. 1, 2008

(54) MOTION CLUTTER SUPPRESSION FOR IMAGE-SUBTRACTING CAMERAS

(76) Inventors: Dixon Cleveland, 8306 Briar Creek Dive, Annandale, VA (US) 22003-4641; Arthur W. Joyce, III, 2752 Pembsly Dr., Vienna, VA (US) 22181

( * ) Notice: Subject to any disclaimer, the term of this patent is extended or adjusted under 35 U.S.C. 154(b) by 717 days.

(21) Appl. No.: 10/640,248

(22) Filed: Aug. 14, 2003

(65) Prior Publication Data

US 2004/0080623 A1    Apr. 29, 2004

Related U.S. Application Data

(60) Provisional application No. 60/403,389, filed on Aug. 15, 2002.

(51) Int. Cl.
*H04N 5/228* (2006.01)
*H04N 5/238* (2006.01)

(52) U.S. Cl. .................. 348/208.4; 348/366; 348/222.1

(58) Field of Classification Search ............. 348/208.1, 348/208.4, 208.6, 208.13, 208.14, 216.1, 348/217.1, 218.1, 221.1, 223.1, 227.1, 228.1, 348/234, 235, 236, 335, 345, 349, 352, 356, 348/362, 363, 366, 367, 368, 370, 371; 382/117, 382/115, 162, 163, 164, 166, 167, 174, 254, 382/255, 256, 258, 266, 268; 386/1, 6, 7, 386/8, 46, 47, 48, 49, 50, 68, 72, 73, 117, 386/120, 121

See application file for complete search history.

(56) References Cited

U.S. PATENT DOCUMENTS

| | | | |
|---|---|---|---|
| 4,158,492 | A | 6/1979 | Kitaura et al. |
| 4,272,787 | A | 6/1981 | Michael et al. |
| 4,274,735 | A | 6/1981 | Tamura et al. |
| 4,315,159 | A | 2/1982 | Niwa et al. |
| 4,490,037 | A | 12/1984 | Anagnostopoulos et al. |
| 4,636,850 | A | 1/1987 | Stewart |
| 4,678,323 | A | 7/1987 | Sato et al. |
| 4,755,874 | A | 7/1988 | Esrig et al. |
| 4,843,565 | A | 6/1989 | Rose |
| 4,851,689 | A | 7/1989 | Hasegawa |
| 4,878,116 | A | 10/1989 | Thomas et al. |
| 4,888,644 | A | 12/1989 | Wilson |
| 4,985,774 | A | 1/1991 | Ishida et al. |
| 5,115,321 | A | 5/1992 | Ishida et al. |
| 5,162,914 | A | 11/1992 | Takahashi et al. |
| 5,287,183 | A * | 2/1994 | Thomas et al. ............. 348/571 |
| 5,376,783 | A | 12/1994 | Vecht et al. |

(Continued)

OTHER PUBLICATIONS

International Search Report PCT/US03/25477, LC Technologies, Inc.

*Primary Examiner*—Ngoc-Yen Vu
*Assistant Examiner*—Albert H Cutler

(57) ABSTRACT

Embodiments of the present invention relate to systems and methods for minimizing motion clutter in image-generation devices. Temporally-interleaved image-subtraction reduces the magnitude of motion clutter and has no adverse effect on the desired ambient-light cancellation of static images. Embodiments of image-generation devices employing temporally-interleaved image-subtraction include single, double, triple, and series accumulator configurations. All four embodiments allow synchronization with scene illuminators and may be implemented on a single electronic chip. Temporally-interleaved image-subtraction is particularly well suited for use in video eyetracking applications where ambient light and scene motion can cause significant problems.

34 Claims, 14 Drawing Sheets

U.S. PATENT DOCUMENTS

| | | |
|---|---|---|
| 5,617,141 A | 4/1997 | Nishimura et al. |
| 5,631,976 A | 5/1997 | Bolle et al. |
| 5,657,402 A | 8/1997 | Bender et al. |
| 5,705,807 A | 1/1998 | Throngnumchai et al. |
| 5,754,682 A | 5/1998 | Katoh |
| 5,760,415 A | 6/1998 | Hauck et al. |
| 5,818,954 A * | 10/1998 | Tomono et al. ............. 382/115 |
| 5,982,951 A | 11/1999 | Katayama et al. |
| 6,021,210 A | 2/2000 | Camus et al. |
| 6,128,108 A | 10/2000 | Teo |
| 6,157,751 A | 12/2000 | Olson et al. |
| 6,256,067 B1 | 7/2001 | Yamada |
| 6,278,490 B1 | 8/2001 | Fukuda et al. |
| 7,012,635 B2 * | 3/2006 | Umeda et al. ........... 348/208.4 |

\* cited by examiner

MOTION CLUTTER SUPPRESSION FOR IMAGE-SUBTRACTING CAMERAS

This application claims the benefit of U.S. Provisional Patent Application Ser. No. 60/403,389, filed Aug. 15, 2002, which is herein incorporated by reference in its entirety.

BACKGROUND OF THE INVENTION

1. Field of the Invention

Embodiments of the present invention relate to image processing. More particularly, embodiments of the present invention relate to systems and methods for image processing that subtract successive images to provide a resultant composite image, for purposes such as ambient light canceling, motion clutter suppression, or motion detection.

2. Background Information

Within the field of photography and image processing, a class of operations involves the subtraction of successive images captured from a camera to obtain a desired effect in the resultant composite image. For example, image subtraction is used to capture and emphasize lighting differences arising from alternate forms of scene illuminations, or to detect moving objects within a scene.

One example of image subtraction is ambient-light-canceling (ALC) photography. A camera captures two successive images of a scene, one with a camera lamp illuminating the scene and the other with the camera lamp off, and the two images are subtracted to form a synthetic image. Assuming that neither the camera nor the scene has moved between the two image-capture periods, and that the ambient light, i.e., the light coming from sources other than the camera lamp, has remained relatively constant between the two image captures, the subtracted image represents what the scene would look like if it were illuminated by the camera lamp only, without the ambient light. The subtraction of the two successive images cancels the effect of the ambient light, but leaves the effect of the camera lamp.

The process of eliminating ambient light from a camera image by subtracting two successive images, one image taken with the camera illuminator on and the other camera image taken with the camera illuminator off, is described in U.S. Pat. No. 4,274,735 by Tamura et al., U.S. Pat. No. 4,315,159 by Niwa et al., U.S. Pat. No. 4,490,037 by Anagnostopoulos et al., U.S. Pat. No. 5,287,183 by Thomas et al., U.S. Pat. No. 6,021,210 by Camus et al., and U.S. Pat. No. 6,256,067 by Yamada.

Image subtraction, however, is highly sensitive to scene motion, either to motion of the camera or to motion of objects within the scene. Indeed, because image-subtraction is sensitive to image motion, motion detection is a second key application of image subtraction. If there is motion between the successive images, all or portions of the two images become spatially displaced with respect to each other, and the image subtraction results in residuals around the edges of the moving objects.

While it is desired to emphasize the effects of motion in motion-detection applications, it is often desired to minimize motion effects in other applications of image subtraction. In applications where motion effects of image-subtraction are undesirable, these motion effects are often called 'motion clutter.' Motion clutter, for example, is generally highly undesirable in ambient-light-cancellation applications.

While the term "camera" typically implies the generation of images from light, one skilled in the art will appreciate that the term "camera" is contemplated to include all forms of imagers that generate images from any form of physical wave, including vibrational waves and/or particle wavefronts. Waves include, for example, visible and non-visible light, electromagnetic, radar, x-rays, gamma rays, electron, magnetic, magnetic-resonance, sonic, ultrasonic, seismic, surface, body, compression, and longitudinal waves. Particle wavefronts include nuclear particles (such as electrons, protons, positrons, neutrinos, etc.) atomic particles, molecular particles, and other material particles. The concepts discussed here apply to all wavelengths, visible or invisible, audible or inaudible. Additionally, the concepts apply to both single-frame and video modes of camera operation. Finally, though images are typically considered to be two-dimensional, the concepts discussed here apply to any number of image dimensions, including 1, 2, 3, and more.

Ambient-light-cancelling Photography

Camera images formed with multiple light sources on a scene are conceptually equivalent to the superposition of multiple images, each formed with individual light sources. Once an aggregate image is formed however, it is generally not possible to separate its constituent images. If a specialized camera properly captures an appropriate set of constituent images ahead of time, however, the desired synthetic images can be generated computationally, typically by an additive or subtractive operation on the constituent images on pixel-by-pixel basis.

It is known that the effects of ambient light may be largely reduced or eliminated from a camera's image by taking two consecutive images, one with the camera's controlled illuminator on and the other with the camera illuminator off, and then subtracting the two images to form the composite ambient-light-cancelled image.

Assuming that the ambient illumination remains approximately constant during the two image periods, the subtraction of the off-cycle image from the on-cycle image results in a net-zero contribution from the ambient light source, while leaving the full result of the camera's illumination in the resultant image.

FIGS. 1-3 illustrate the results of ambient light cancellation achieved using image subtraction. The objective of this camera is to detect (i.e. highlight) objects in the foreground and ignore (i.e. suppress) objects in the background. In this example scene, there is a person in the foreground, there is a house and a parked car in the near background, and there is a (unrealistically) stationary airplane in the far background. The ambient illumination is normal daylight. The camera's controlled illuminator is a flash attachment.

The first camera image A, 100 shown in FIG. 1, is taken with a flash attachment on the camera. The second camera image B, 200 shown in FIG. 2, is taken without a flash. Due to the daytime condition, the foreground and background objects are illuminated equally by the ambient daylight. The flash is not particularly bright with respect to the ambient daylight, so the person in the foreground is only slightly highlighted in FIG. 1 in comparison to FIG. 2.

The final output image C, 300 shown in FIG. 3, represents the "subtracted" or "difference" image, i.e. the image 300 in FIG. 3 equals the image 100 in FIG. 1 minus the image 200 in FIG. 2. (The difference image C, 300 in FIG. 3 is also magnified for purposes of displaying the contrast in the resultant composite image.) The key results of the subtracted image C, 300 in FIG. 3 are that the objects in the foreground are highlighted, and the objects in the background are suppressed.

The person in the foreground now stands out significantly from the background, making objects in the foreground far easier to detect with respect to objects in the background.

Note that the subtracted image C, 300 in FIG. 3 is the same as if the picture were taken with a flash at night, without ambient daylight; the illumination from the flash highlights objects in the foreground.

Motion Detectors

Image-subtraction photography is also used to detect objects that are moving within a scene. When using image subtraction to perform motion detection, typically both the first and second images are illuminated equally. When the two images are subtracted, all the stationary objects are 'cancelled out' in the composite image, leaving only a uniform "neutral-gray" response. If an object moves, however, the images of the object are spatially separated between the first and second constituent images, so the subtraction does not result in pure cancellation of the object image; rather, the subtraction results in a residual 'ghost' image around the edges of the moving object. The existence of the ghosted image within the otherwise neutral-gray background allows the moving object to be detected easily within the subtracted image.

As an object moves, the ghosting effect occurs around the leading and trailing edges of the object. Edges of an object are typically characterized by a change, i.e., a gradient, in the image intensity. As an object moves between two successive images, the differences in the leading and trailing edge locations between the two successive images produce a difference in intensity that shows up as non-neutral-gray in the difference image. It is the emergence of the edges of the moving objects that produces the ghosting effect.

Since the ghosting appears along the leading and trailing edges of moving objects, the ghost image emphasizes the object's direction of motion. If the surrounding background of an object is brighter than the object, the leading edge of the ghost image appears brighter than neutral gray. In the first image, the area just ahead of the moving object is the brighter background intensity. In the second image, that area is replaced by the darker intensity of the object that has moved into the space. When the two images are subtracted, the lower (darker) intensity of the second image is subtracted from the brighter (higher) intensity of the first image, resulting in a net brighter-than-neutral-gray in the difference image.

Conversely, if the background is darker than the object, the leading edge of the object appears darker than neutral gray. Similarly, the trailing edges of dark objects are dark, and the trailing edges of bright objects are bright.

FIGS. 4-6 illustrate the results of motion detection achieved using subtraction of successive images. In this example, the scene is the same as in the above ambient-light-cancellation example shown in FIGS. 1-3, except that the car and plane are now in motion. The illumination is identical for both of the constituent photos. The two successive raw (i.e. constituent) images A, 400 and B, 500 are shown in FIGS. 4 and 5, respectively. The difference image C, 600, i.e., the image A, 400 in FIG. 4 minus the image B, 500 in FIG. 5, is shown in FIG. 6. The key results of the subtracted image are that the moving objects have been highlighted, and the stationary objects have been suppressed.

Note the ghosting effect on the highlighted moving objects, i.e., the ghosting on the car and the plane. Since the surrounding backgrounds of both the car and plane are brighter than the vehicles themselves, the leading edges of these objects are bright and the trailing edges are dark. It can thus be deduced from the ghost images that both vehicles are moving leftward.

Also note that in image-subtraction, the subtraction process results in positive intensities in areas where the 'added' image is brighter than the 'subtracted' image, and results in negative intensities where the 'subtracted' image is brighter than the 'added' image. To accommodate negative intensities when displaying difference images, the difference image is customarily drawn with a "neutral gray" value so that all display intensities are positive and can be interpreted visually. In areas of the two constituent images where both intensities are equal, the subtracted output takes the value of the neutral-gray offset. Brighter-than-neutral-gray regions indicate that the 'added' image is brighter, and darker-than-neutral-gray regions indicate that the 'subtracted' image is brighter.

Image Subtraction Timing

FIG. 7 illustrates the timing for a typical image-subtraction frame capture. Periods A, 71, and B, 72, represent the shutter periods during which two constituent images A and B are captured. The durations of the two periods are $\Delta t_A$ and $\Delta t_B$, and the overall frame period for the composite image, 73, includes both $\Delta t_A$ and $\Delta t_B$. To achieve the desired image-subtraction effects, the lighting conditions for the two images are typically synchronized to their respective shutter periods.

As shown in FIG. 7, conventional image subtraction involves the subtraction of two images, where the full-scaled intensity profile of one captured image is subtracted from the full-scale intensity profile of the second to form the final image.

Motion Clutter

In many image-subtraction applications, such as ambient light cancellation, the ghosting effects of object motion are undesired. When the ghosting is unwanted, it is referred to as "motion clutter." Physically, the desired ghosting effects in motion detectors and the undesired motion clutter effects in ambient-light-cancellation applications are identical. The difference lies only in the desirability of the effect when images are subtracted.

Motion clutter, like ghosting, is measured in units of image brightness, i.e., image intensity. In motion detection applications, the reference level for "zero ghosting" is neutral gray. At all positions in the image where there is no moving object, the subtracted image is neutral gray, and therefore no ghosting exists. As the intensity of the subtracted image moves away from neutral gray, either positively or negatively, the magnitude of the ghosting increases. In ambient-light-cancellation applications, the reference level for "zero motion clutter" is black. The magnitude of motion clutter is measured as an increase in brightness from black.

Note that motion clutter is a different phenomenon than motion blur, though both result from motion in the camera scene. Blur results from scene motion during the overall frame period, whether or not image subtraction is performed. Motion blur can be seen on the moving car in FIGS. 4 and 5, where subtraction has not yet been performed. Motion clutter, i.e., the ghosting phenomenon illustrated in FIG. 6, on the other hand, only results when images are subtracted, as it is in motion-detection and ambient-light-cancellation photography, to form the final image.

In image subtraction, the spatial displacement $\Delta x$ of a moving object in two successive camera images is proportional to both the velocity V of the objects in the scene and the average temporal offset $\Delta t$ between the shutter periods of the two images:

$$\Delta x = V \times \Delta t \quad \text{(Eq 1)}$$

This quantity Δx, i.e., the average spatial displacement between images, is also called the 'motion clutter width,' which refers to the width of the ghosting edges that appear in the motion clutter. It is assumed in the above equation that there is no appreciable "dead time" between the two image shutter periods. Dead time between shutter periods further increases image motion clutter.

If the shutter periods $\Delta t_A$ and $\Delta t_B$ are different, the average time difference Δt between two successive shutter periods is equal to the average of $\Delta t_A$ and $\Delta t_B$:

$$\Delta t = (\Delta t_A + \Delta t_B)/2 \quad (Eq\ 2)$$

An example of undesired motion clutter is illustrated in FIGS. 8-10. In this example, the camera's objective is to highlight objects in the foreground. Highlighting of foreground objects is accomplished by ambient light cancellation, i.e., by image subtraction and using a controlled flash during one of the image captures. The camera configuration is the same as that used to generate the images in FIGS. 1-3 (ambient light cancellation). In this new example, however, the car and the plane in the background are now moving, while they were still in the example of FIGS. 1-3. Note that the ghosted images of the moving car and plane now appear in the composite, subtracted image, shown in FIG. 10. Furthermore, the ghosted images of the car's tires are even brighter than the person in the foreground. In this example, where the camera's objective is to highlight objects in the foreground and suppress images in the background, the ghosted images of the moving car and plane in the background are undesirable.

BRIEF SUMMARY OF THE INVENTION

Embodiments of the present invention relate to systems and methods for suppressing motion clutter while providing ambient light cancellation in dynamic camera scenes. In contrast to conventional image-subtraction frame capture techniques, in which the full-scaled intensity profile of one captured image is subtracted from the full-scale intensity profile of the second to form a final image, the present invention temporally interleaves sub-periods of the constituent images, and can incorporate more than two images in the formation of the final composite image. Specifically, the present invention temporally interleaves the collection of A and B images within an overall frame exposure period.

Referring to the equations discussed above, to minimize the magnitude of motion clutter in dynamic camera scenes, it is necessary to minimize the motion clutter width Δx, which, as a consequence of Eq 1, means that it is necessary to minimize the inter-image offset time Δt. If a single pair of images is used in the image subtraction, however, reducing the inter-image offset time results in an equal reduction of image shutter time Δt, which in turn reduces the total light available to generate quality images. To maintain long net frame illumination periods while simultaneously decreasing Δt, and thus minimizing motion clutter, the present invention temporally interleaves the collection of the A and B images within the overall frame exposure period.

One embodiment of the present invention provides a method for suppressing motion clutter that includes accumulating constituent images over multiple sub-periods and temporally interleaving the sub-periods of the different constituent images. A composite image is formed from the subtraction of the accumulated constituent images. The number of sub-periods equals the factor by which the magnitude of motion clutter is reduced. A further embodiment involves controlling one or more camera-scene illuminators that are synchronized with the capture of sub-periods of the constituent images.

Another embodiment of the present invention provides an apparatus for suppressing motion clutter when forming a composite camera image from the subtraction of constituent images. The apparatus includes a containing means for accumulating each constituent image over multiple sub-periods where the sub-periods of the different constituent images are temporally interleaved. In a further embodiment, the apparatus also includes a control means for one or more camera-scene illuminators that are synchronized to the capture sub-periods of the constituent images.

Four additional embodiments of an image-generation device that use temporally-interleaved constituent images to achieve motion clutter minimization are provided. All four embodiments have an image sensor that is capable of generating an image-sensor output to a physical wave input. In a first embodiment, the image-sensor output is directed to one of two constituent-image accumulators by an accumulator-control switch. This is called the double accumulator configuration. A controller toggles the accumulator-control switch to direct the image sensor output to either one of the two constituent-image accumulators multiple times within an overall frame-capture period. Finally, the constituent images from the two constituent-image accumulators are subtracted to form a composite image.

In a second embodiment, the image-sensor output is first sent to a sub-period accumulator that accumulates the image-sensor output within individual sub-frame periods. Output from the sub-period accumulator is directed to one of two constituent-image accumulators by an accumulator-control switch. Since this embodiment has three accumulators it is called the triple accumulator configuration. A controller initializes the sub-period accumulator before each sub-period and generates an accumulator-control switch signal that toggles the output of the sub-period accumulator between the two constituent-image accumulators multiple times within an overall frame-capture period. The constituent images from the two constituent-image accumulators are then subtracted to form a composite image.

In a third embodiment, the image-sensor output is directed to a single image accumulator that forms the composite image. This embodiment is called the single accumulator configuration. An accumulator-control switch controls whether or not the image-sensor output is added to or subtracted from the image accumulator. A controller generates an accumulator-control switch signal that toggles between addition and subtraction multiple times within an overall frame-capture period.

Similarly, in a fourth embodiment, the image-sensor output is sent first to a sub-period accumulator that accumulates the image-sensor output within individual sub-frame periods. The output of the sub-period accumulator is then directed to a single composite-image accumulator that accumulates a composite image comprised of added and subtracted sets of sub-images. Since the sub-period accumulator and composite-image accumulator operate in series, this embodiment is called the series accumulator configuration. An accumulator-control switch directs the output from the sub-period accumulator to be added to or subtracted from the composite-image accumulator. A controller initializes the sub-period accumulator before each sub-period and generates an accumulator-control switch signal that toggles between addition and subtraction multiple times within an overall frame-capture period.

All four embodiments may further include at least one scene illuminator that is connected to its power source through a scene illuminator-control switch. The scene illuminator-control switch may be synchronized with the accumulator-control switch. This may be accomplished by having the controller generate an illuminator-control signal in response to the accumulator-control switch signal. This illuminator-control signal may or may not be the same as the accumulator-control switch signal. Alternatively, this may be accomplished by having the controller generate an accumulator-control switch signal in response to an externally generated illuminator-control signal.

In electronic cameras, the accumulators are implemented on the same electronic circuit chip that contains the photo sensor. Consequently, embodiments of the present invention may be implemented on a single electronic chip.

Finally, the effects of head motion and ambient light cause significant problems in video eyetracking applications. As a result, embodiments of the present invention may be advantageously used in eyetracking applications.

Figure 1:
FIG. 1 is an exemplary first camera image taken with a flash attachment where all objects in the image are stationary, which is used to illustrate the results of ambient light cancellation achieved using subtraction of successive images.
Figure 2:
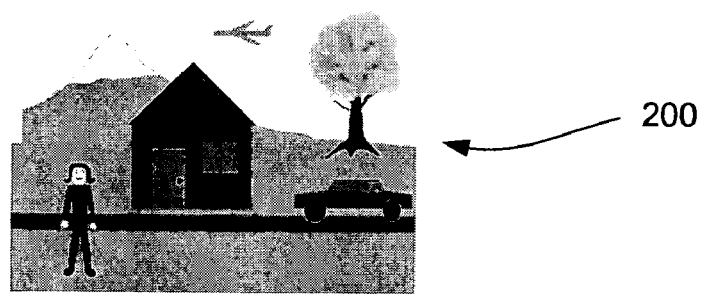
FIG. 2 is an exemplary second camera image taken without a flash attachment where all objects in the image are stationary, which is used to illustrate the results of ambient light cancellation achieved using subtraction of successive images.
Figure 3:
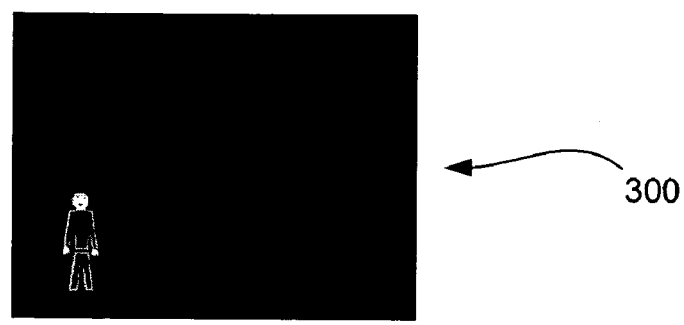
FIG. 3 is an exemplary third difference image that results from subtracting the image in FIG. 2 from the image in FIG. 1, which is used to illustrate the results of ambient light cancellation achieved using subtraction of successive images.
Figure 4:
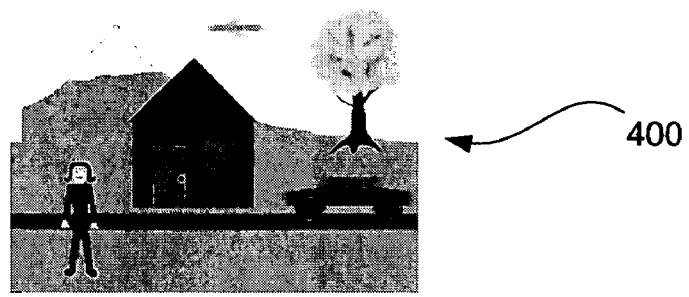
FIG. 4 is an exemplary first camera image taken with a flash attachment where some objects in the image are in motion, which is used to illustrate the results of motion detection achieved using subtraction of successive images.
Figure 5:
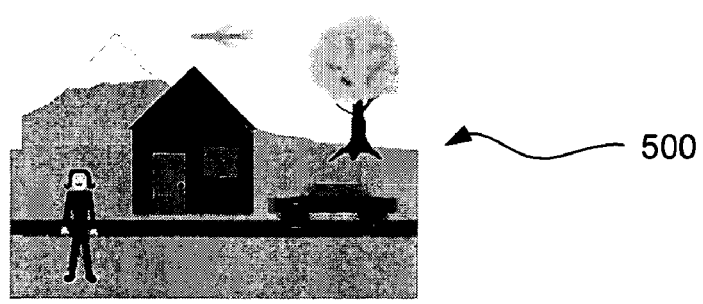
FIG. 5 is an exemplary second camera image taken without a flash attachment where some objects in the image are in motion, which is used to illustrate the results of motion detection achieved using subtraction of successive images.
Figure 6:
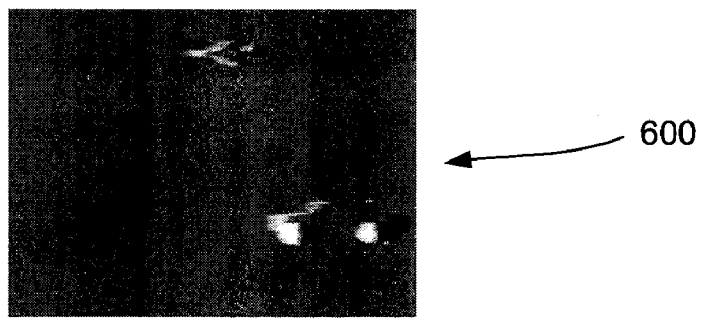
FIG. 6 is an exemplary third difference image that results from subtracting the image in FIG. 5 from the image in FIG. 4, which is used to illustrate the results of motion detection achieved using subtraction of successive images.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

DETAILED DESCRIPTION OF THE INVENTION

Minimization of Motion Clutter

According to an embodiment of the present invention, a system to minimize the magnitude of motion clutter in dynamic camera scenes is described. In order to minimize this motion clutter, it is necessary to minimize the motion clutter width $\Delta x$, which, as a consequence of Eq 1, means that is it is necessary to minimize the inter-image offset time Δt. If a single pair of images is used in the image subtraction, however, reducing the inter-image offset time results in an equal reduction of image shutter time Δt, which in turn reduces the total light available to generate quality images. To maintain long net frame illumination periods while simultaneously decreasing Δt, and thus minimizing motion clutter, the collection of A and B images are interleaved temporally within the overall frame exposure period.

Figure 11:
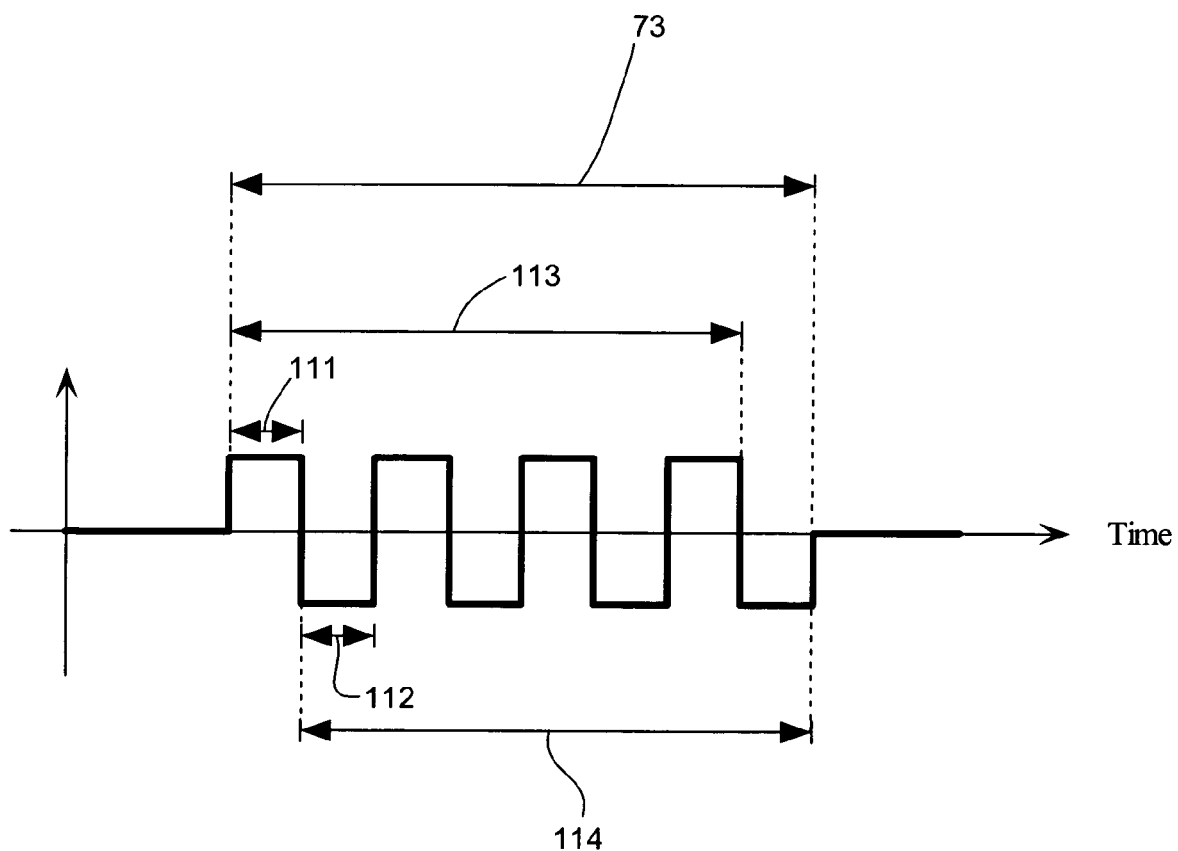
FIG. 11 is a timing diagram illustrating temporally interleaved frame-capture timing for image-subtraction using multiple, sequential pairs of A-type sub-periods and B-type sub-periods, in accordance with an embodiment of the present invention.

FIG. 11 illustrates temporally interleaved frame-capture timing for image-subtraction using multiple, sequential pairs of A-type sub-periods 111 and B-type sub-periods 112. In the FIG. 11 example, the number of sub-period pairs is four, i.e., $N_{sub-period-pairs}=4$. The sequence consists of a high-frequency burst of A-type sub-periods 113, temporally interleaved with a high-frequency burst of B-type sub-periods 114. Similar to traditional single-pair sub-image subtraction, the A/B illumination conditions are synchronized to the A/B shutter periods. In the multiple-pair case, however, the two overall images A and B are formed by the additional step of adding up all the A-type sub-images and all the B-type sub-images, respectively. In this way, the constituent images are accumulated over multiple sub-periods, wherein the sub-periods of the constituent images are temporarily interleaved. These constituent images comprise image-sensor output from a physical wave input, including, for example, light intensity, color, or grayscale.

Figure 7:
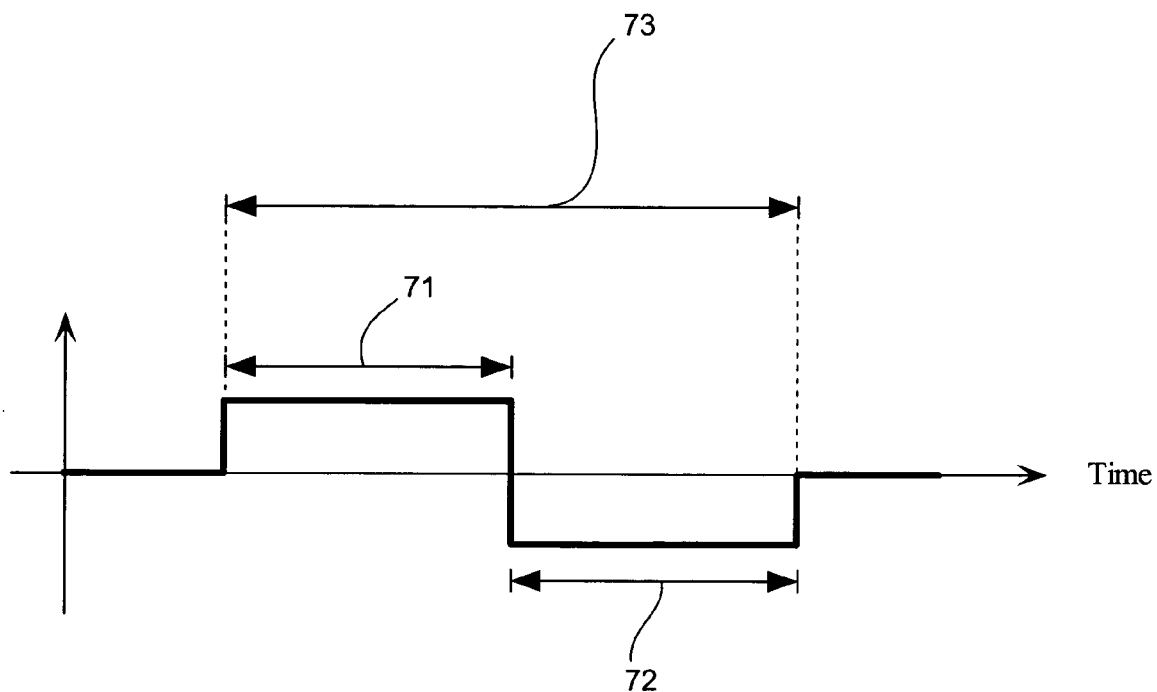
FIG. 7 is an exemplary timing diagram illustrating the timing for a typical image-subtraction frame capture.

Referring back to FIG. 7, note that there is no temporal interleaving in the collection of the constituent images A and B; the collection of image A is fully complete by the time the collection of image B begins. With temporal interleaving, illustrated in FIG. 11, the collections of the two constituent images overlap in time.

The key purpose of temporally interleaving the collection of the A and B images in image-subtracting cameras is to maximally overlap the aggregate shutter periods of the two constituent images in time. This temporal overlap reduces the spatial separation of moving objects in the scene between the two images, thus reducing the motion-clutter effect. When using temporally-interleaved image-subtraction, the magnitude of the motion clutter suppression is reduced by a factor equal to the number $N_{sub-period-pairs}$ of A/B sub-pairs. Thus, increasing the number of sub-pairs increases the effectiveness of motion clutter suppression proportionately. With an ever-increasing number of A/B sub-period pairs, the sub-period intervals Δt may theoretically be reduced indefinitely, providing an arbitrarily small motion clutter width Δx, while simultaneously providing a sufficiently long overall frame exposure period 73 to obtain a high quality image. (Note, however, that while temporally-interleaved-frame-capture minimizes motion clutter, longer overall frame exposure periods are more susceptible to motion blur.)

Figure 8:
FIG. 8 is an exemplary first camera image taken with a flash attachment where some objects in the image are in motion, which is used to illustrate undesired motion clutter resulting from subtraction of successive images.
Figure 9:
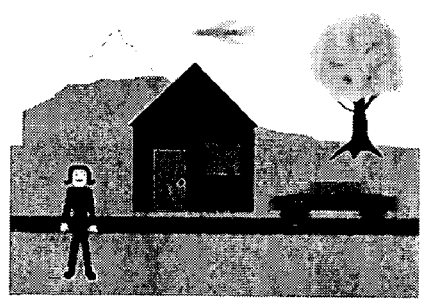
FIG. 9 is an exemplary second camera image taken without a flash attachment where some objects in the image are in motion, which is used to illustrate undesired motion clutter resulting from subtraction of successive images.
Figure 10:
FIG. 10 is an exemplary third difference image that results from subtracting the image in FIG. 9 from the image in FIG. 8, which is used to illustrate undesired motion clutter resulting from subtraction of successive images.
Figure 12:
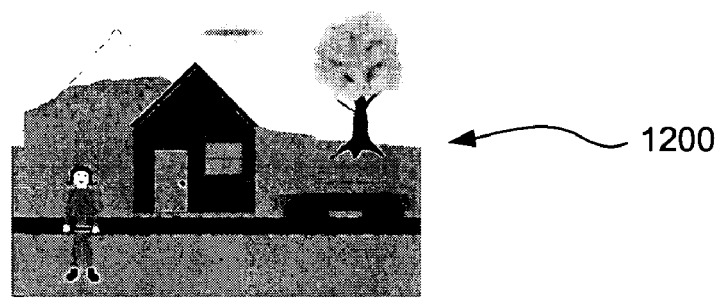
FIG. 12 is an exemplary first camera image taken with a flash attachment where some objects in the image are in motion, which is used to illustrate the net effect of temporally interleaving a collection of images in accordance with an embodiment of the present invention.
Figure 13:
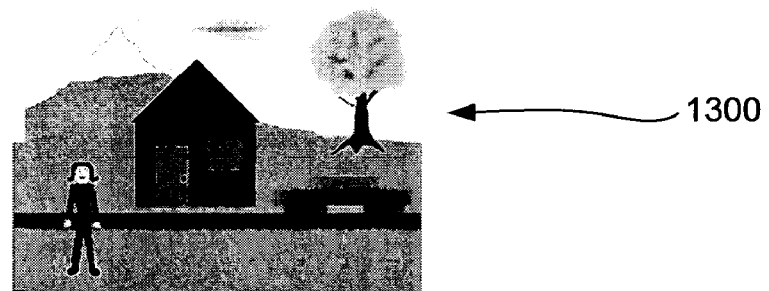
FIG. 13 is an exemplary second camera image taken without a flash attachment where some objects in the image are in motion, which is used to illustrate the net effect of temporally interleaving a collection of images in accordance with an embodiment of the present invention.
Figure 14:
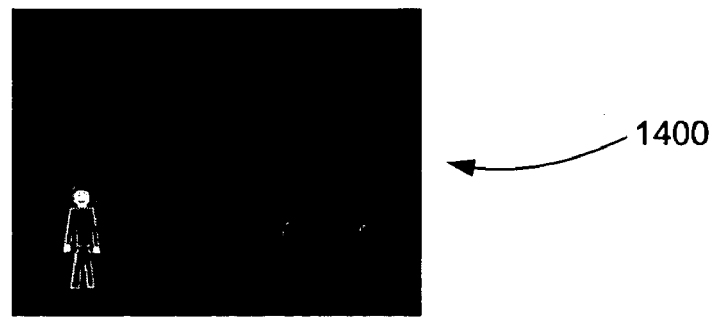
FIG. 14 is an exemplary third image that results from the temporally-interleaved image-subtraction of FIG. 13 from FIG. 12, in accordance with an embodiment of the present invention.

FIG. 14, image C, 1400 illustrates the net effect of temporally interleaving the collection of images A, 1200 of FIG. 12, and B, 1300 of FIG. 13. The original scene (illustrated in FIGS. 8 and 9) is the same as that used in the generation of the non-temporally-interleaved composite image shown in FIG. 10. In FIG. 14, however, the collection image A, 1200 and image B, 1300 is temporally interleaved over a sequence of four A/B sub-pairs; i.e., $N_{sub-period-pairs}=4$ in this embodiment. The overall frame exposure period in FIGS. 12-14 is the same in FIGS. 8-10. Note that the magnitude of the image clutter, i.e. the intensity of the ghosting around the moving car and plane, is significantly decreased, in this case by a factor of 4. In particular, the ghosting of the car tires is highly reduced.

Because the car is in the near background and receives some illumination from the camera flash, the basic image of the car remains, although its ghosting has been significantly suppressed. The image of the airplane in the far background, which received no light from the flash, has almost disappeared, despite its motion.

Figure 15:
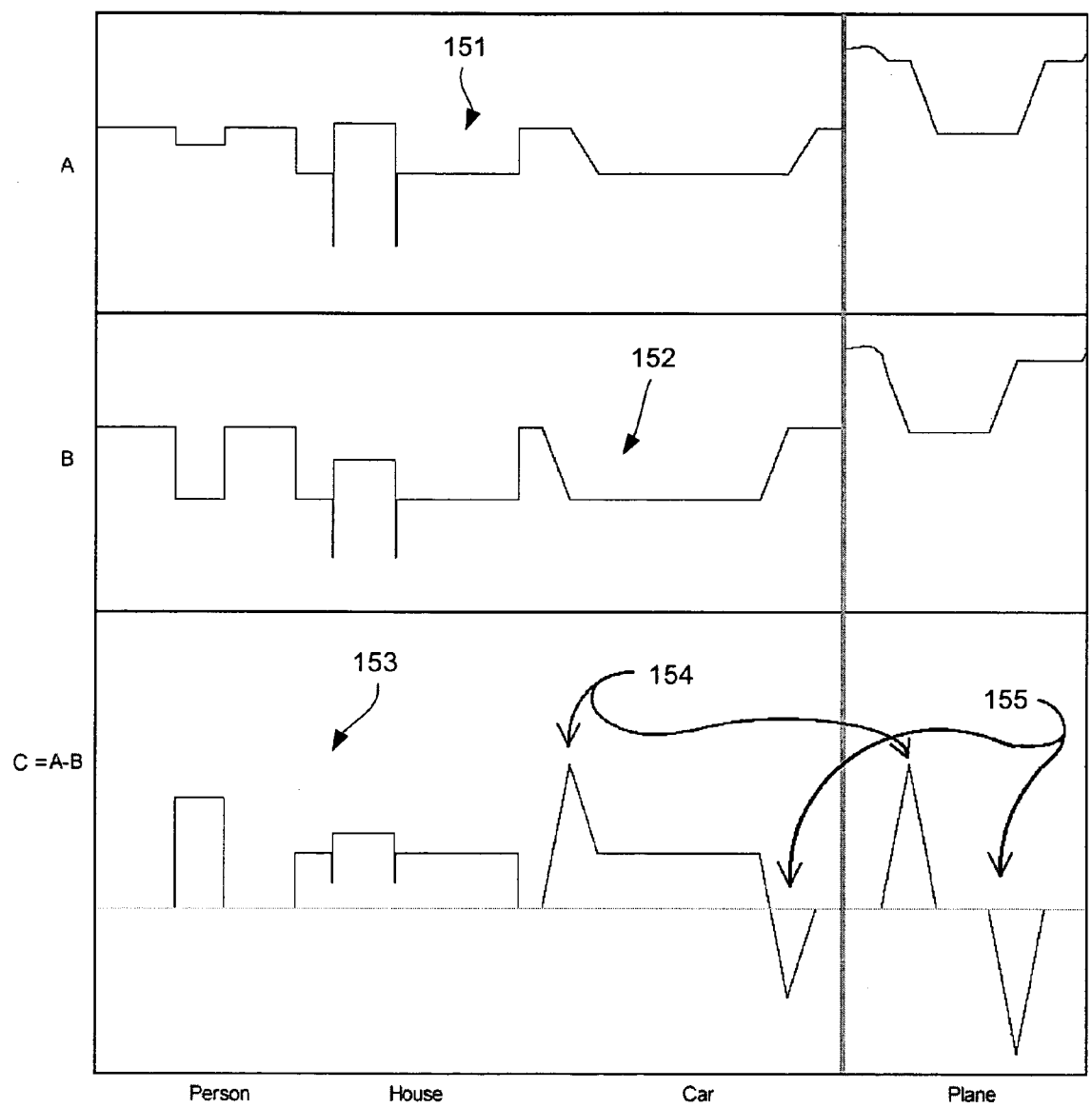
FIG. 15 is an exemplary collection of image intensity profiles taken along a horizontal cut through the middles of the stationary and moving objects in FIGS. 8-10 and shows the results of subtracting non-temporally-interleaved images, in accordance with an embodiment of the present invention.
Figure 16:
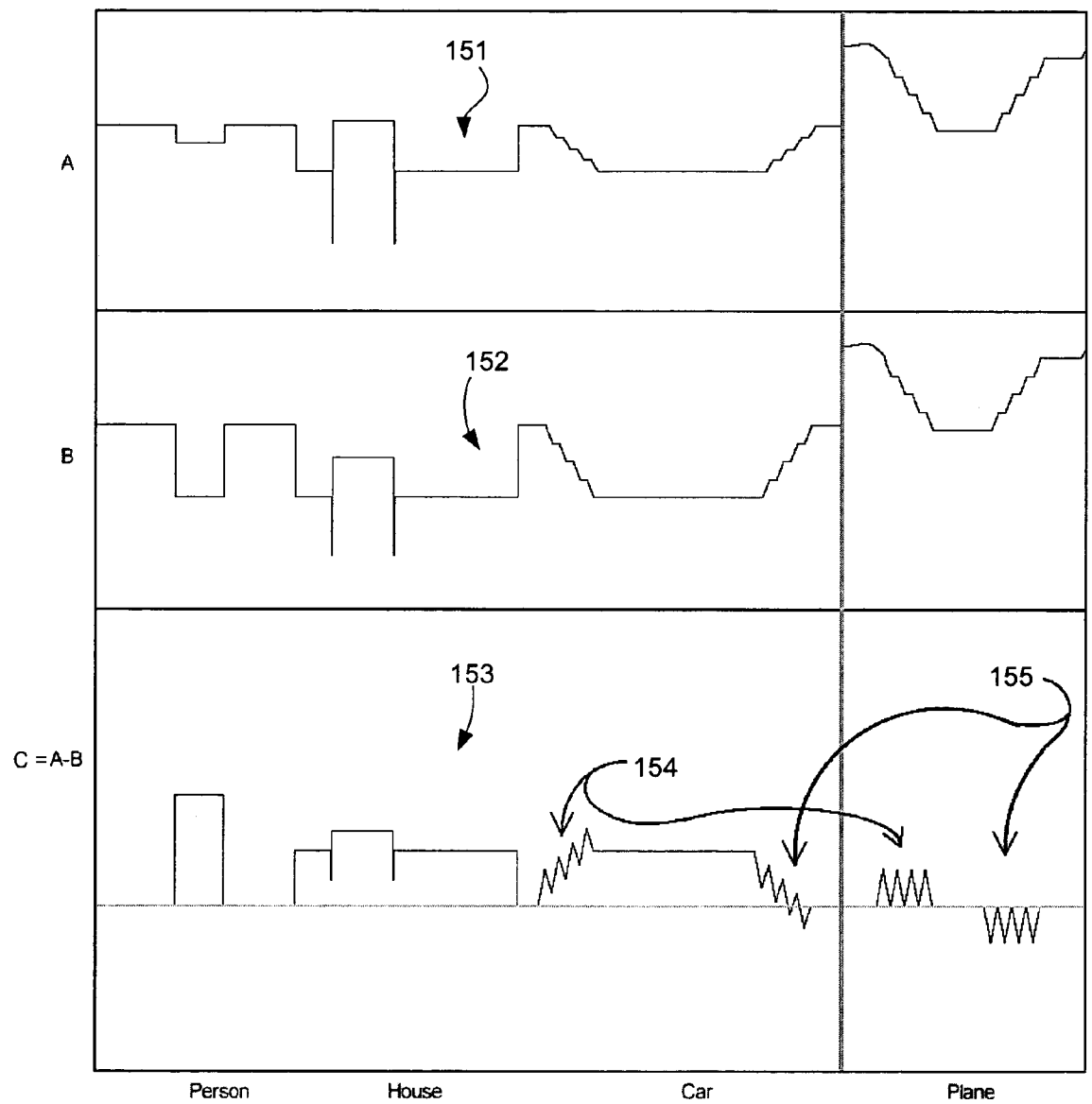
FIG. 16 is an exemplary collection of image intensity profiles taken along a horizontal cut through the middles of the stationary and moving objects in FIGS. 12-14 and shows the results of subtracting non-temporally-interleaved images in accordance with an embodiment of the present invention.
Figure 17:
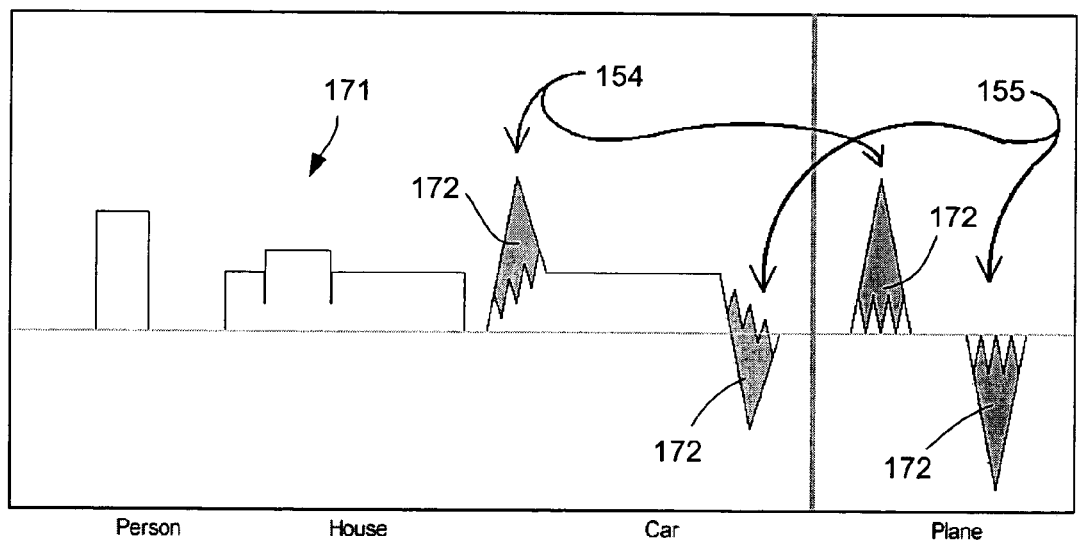
FIG. 17 is a superposition of the exemplary image intensity profiles taken along a horizontal cut through the middles of the stationary and moving objects in FIGS. 10 and 14 and shows the differences in the motion clutter from temporal interleaving, in accordance with an embodiment of the present invention.

To further illustrate the motion-clutter minimization effect of temporally interleaving the collection of the A and B images prior to image subtraction, FIGS. 15, 16, and 17 show image intensity profiles taken along a horizontal cut through the middles of the stationary and moving objects, i.e., through the person, house, car and plane. FIG. 15 shows the results of subtracting non-temporally-interleaved images A and B (extracted from the images of FIGS. 8-10). FIG. 16 shows the results of subtracting temporally-interleaved images $A=\{A_1+A_2+A_3+A_4\}$ and $B=\{B_1+B_2+B_3+B_4\}$ (extracted from the images of FIGS. 12-14). The upper panels in FIGS. 15 and 16 show the intensity profiles of the two constituent images A, 151, and B, 152, and the bottom curve in each Figure shows the intensity profile of the subtracted composite image C=A−B, 153.

The key results of the image subtraction process are illustrated in the intensity profiles of the subtracted, composite image C, 153, displayed in the bottom panels of FIGS. 15 and 16. As illustrated in these intensity profiles, the person, house and car all "stand out" significantly, as they should, in accordance with the ambient-light-cancellation objective. The intensity profiles of each of these three items, illuminated by the flash, appear as an "object" with a left edge, a body, and a right edge. "Standing out" is indicated by positive image brightness, i.e., image intensity levels greater than zero, with respect to black, which is indicated by zero image intensity.

Note that the image intensity profile of the airplane, however, still stands out, despite receiving negligible light from the camera's flash attachment. Though the plane's intensity profile has no body (because it received no light from the flash), it does exhibit motion clutter at its leading edge, 154, and trailing edge, 155. Ideally, given the ambient-light-canceling camera's objective of highlighting only near-field objects, there would be no image of the plane at all.

The images of both the car and plane, because they are moving, are distorted by motion clutter at their leading edge, 154, and trailing edge, 155. This motion clutter results from the interacting dynamics of the moving vehicles, the image capture, and the image subtraction. The purpose of temporal interleaving is to reduce the magnitude of this motion clutter. As can be seen by comparing FIGS. 15 and 16, temporal interleaving significantly reduces the magnitude of motion clutter.

The intensity curves in the subtracted images (i.e., image C=image A−image B) go negative at the trailing edges, 155, of the car and plane. These negative values indicate regions where image A, which is taken with the flash, is actually darker than image B, which is taken without the flash. These negative values result from motion of the car and plane. In ambient light cancellation photography (in contrast to motion detection photography), negative intensities are typically displayed as black, i.e., they are treated as having zero intensity. In FIGS. 15, 16, and 17, however, the negative values are shown for purposes of mathematical completeness.

The advantage of temporally interleaving the constituent images A and B is illustrated by comparing the magnitude of the motion clutter in profile 153 in FIG. 15, where there is no temporal interleaving, to the reduced motion clutter in profile 153 in FIG. 16, where there is temporal interleaving.

FIG. 17 shows the superposition of these subtracted-image profiles, 171. The differences in the motion clutter resulting from temporal interleaving are highlighted in gray, 172.

The comparison of the temporally-interleaved and non-temporally-interleaved intensity profiles in FIG. 17 illustrate two key points:

One, the intensity profile of the temporally-interleaved image is different from the non-temporally-interleaved image only at the leading edge, 154, and trailing edge, 155, of the moving vehicles. Thus the temporal interleaving affects only motion clutter; it has no effect (in particular, no adverse effect) on the desired ambient-light cancellation on static images.

Two, and more importantly, the temporal interleaving significantly reduces the magnitude of the motion clutter, as indicated by the gray regions, 172, in FIG. 17. In the non-temporally-interleaved (conventional) case, the object's leading edge, 154, and trailing edge, 155, clutter patterns each consist of a single, large intensity peak. Each peak has a single rising slope and a single falling slope. In contrast, the motion clutter on each of the leading edge, 154, and trailing edge, 155, of the temporally interleaved image appears as a "saw-tooth" pattern, consisting of a series of interleaved rising and falling slopes that form four smaller motion-clutter peaks. The spatially interleaved rising and falling slopes in the intensity curve arise because of the temporal interleaving of the constituent image captures. In this example there are four peaks, or four "teeth," in each edge's motion-clutter pattern. The magnitude of the motion clutter is reduced by a factor of four, because the camera used four temporally interleaved pairs of A/B sub-periods ($N_{sub\_period\_pairs}=4$).

In another embodiment, if a larger number of A/B sub-period pairs is used, the magnitude of the motion clutter decreases proportionately. As the number of pulse pairs is increased, the number of teeth in the motion clutter's saw-tooth pattern increases, and the heights of the individual teeth decrease proportionately. In the limiting case with a very large number of sub-period pairs, the saw-tooth pattern eventually approaches a straight line, completely eliminating motion-clutter.

By comparison to the large, single peak that results from conventional, non-temporally-interleaved image subtraction, the motion-clutter suppression achievable with temporal interleaving is theoretically limitless. In the case of the airplane example, the saw-tooth clutter pattern would approach a horizontal straight line with zero height, and the image of the plane would disappear completely. In the case of the car, the leading and trailing edges of the object would become sloped lines, representing conventional motion blur. The images of the leading and trailing edge would contain no residual motion clutter.

Computational Bottlenecks in Image Subtraction

When using a conventional electronic camera sensor and a computer to perform image subtraction, the process involves the serial transfer and digitization of the raw constituent images and the subsequent pixel-by-pixel subtraction of the constituent images to form the composite image. These processes may be excessively time consuming and may severely limit the speed at which composite images can be formed. If multiple, temporally-interleaved sub-period images are generated to minimize motion clutter, the processing loads of the digitization and subtraction processes are further multiplied by the number of sub-period A/B pairs used.

One embodiment of the present invention uses dedicated, special purpose hardware, wherein the accumulations for each pixel within the image are performed in parallel. This eliminates the requirement for the camera sensor to (serially) output multiple sub-period images per frame, and eliminates the requirement for the computer to (serially) perform all the additions and subtractions (accumulations) of the sub-period images. In preferred embodiments, the accumulators are implemented on the same platform that contains the image sensor. In electronic cameras, the accumulators are implemented on the same electronic circuit chip that contains the photo sensor, for example. Thus, the composite image is fully generated within the camera sensor chip, and it is available for direct output at the end of the overall frame exposure period.

Alternate Embodiments of
Image-Subtracting/Motion-clutter-minimizing
Cameras

Following are four alternative embodiments for image-subtracting cameras, or more generally image-generation devices, that use temporally-interleaved constituent images to achieve motion-clutter minimization. Each embodiment begins with a sensor device that is capable of generating an image-sensor output in response to a physical wave input. Typically, the sensor output is a two-dimensional, time-varying image representation of the wavefront's energy distribution as the waves impinge on the sensor surface. The concepts apply, however, to any number of image dimensions.

Double Accumulator Configuration

Figure 18:
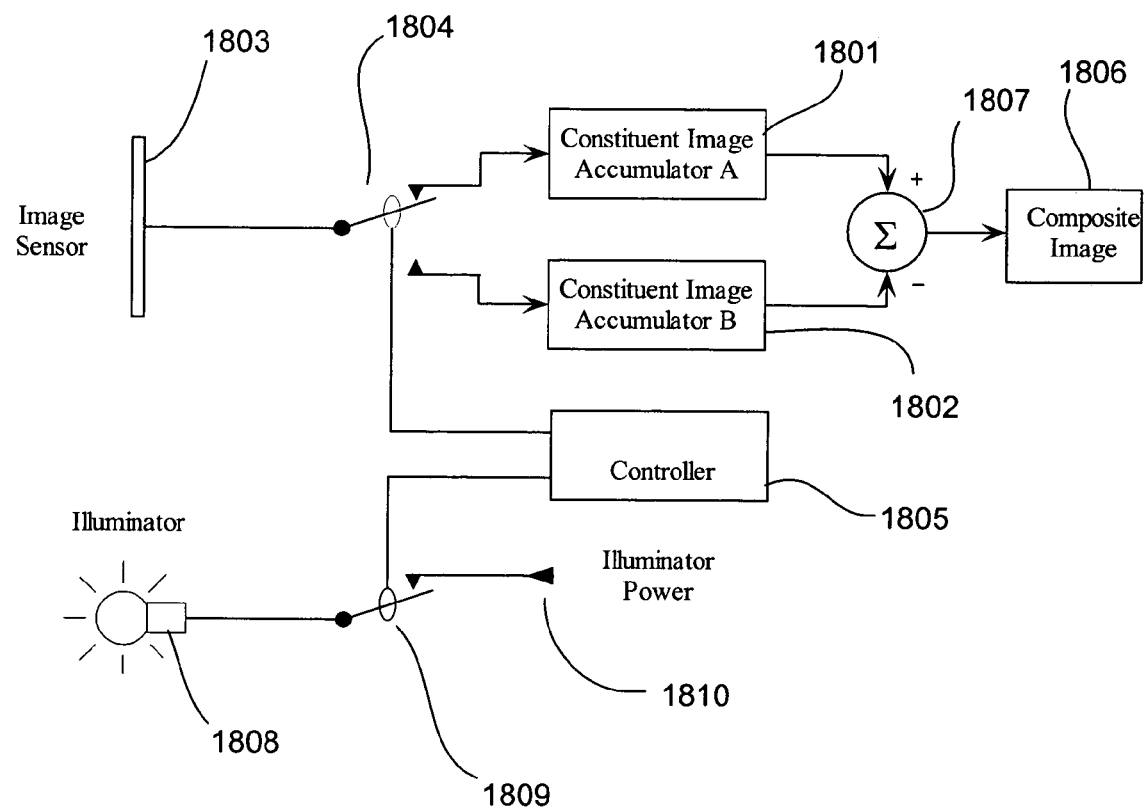
FIG. 18 is a double accumulator configuration for an image-generation device that uses temporally-interleaved constituent images to achieve motion-clutter minimization, in accordance with an embodiment of the present invention.

FIG. 18 is a double accumulator configuration for an image-generation device that uses temporally-interleaved constituent images to achieve motion-clutter minimization in accordance with an embodiment of the present invention. The image-generation device contains constituent-image accumulator A, 1801, and constituent-image accumulator B, 1802, where the output of image sensor 1803 may be switched, using accumulator-control switch 1804, between the inputs of the two accumulators during the camera's overall frame exposure period. Throughout the overall frame exposure period, controller 1805 toggles accumulator-control switch 1804 between A and B states at a high rate, and switches the output of image sensor, 1803, between the A and B accumulators, respectively, by controlling accumulator-control switch 1804.

At the end of the overall frame exposure period, accumulator A, 1801, and accumulator B, 1802, each contain a temporally-interleaved constituent image. The camera forms the final, composite output image, 1806, by subtracting the two constituent images with processor 1807. Controller 1805 also controls the image-generation device's scene illuminator 1808 by controlling switch 1809 between scene illuminator 1808 and scene illuminator power 1810. In one embodiment, the control signal to scene illuminator-control switch 1809 is identical to the control signal to accumulator accumulator-control switch 1804. In another embodiment, the control signal to scene illuminator-control switch 1809 is not identical to the control signal to accumulator accumulator-control switch 1804. In both embodiments, however, controller 1805 drives scene illuminator-control switch 1809 in synchronization with accumulator accumulator-control switch 1804.

Triple Accumulator Configuration

Figure 19:
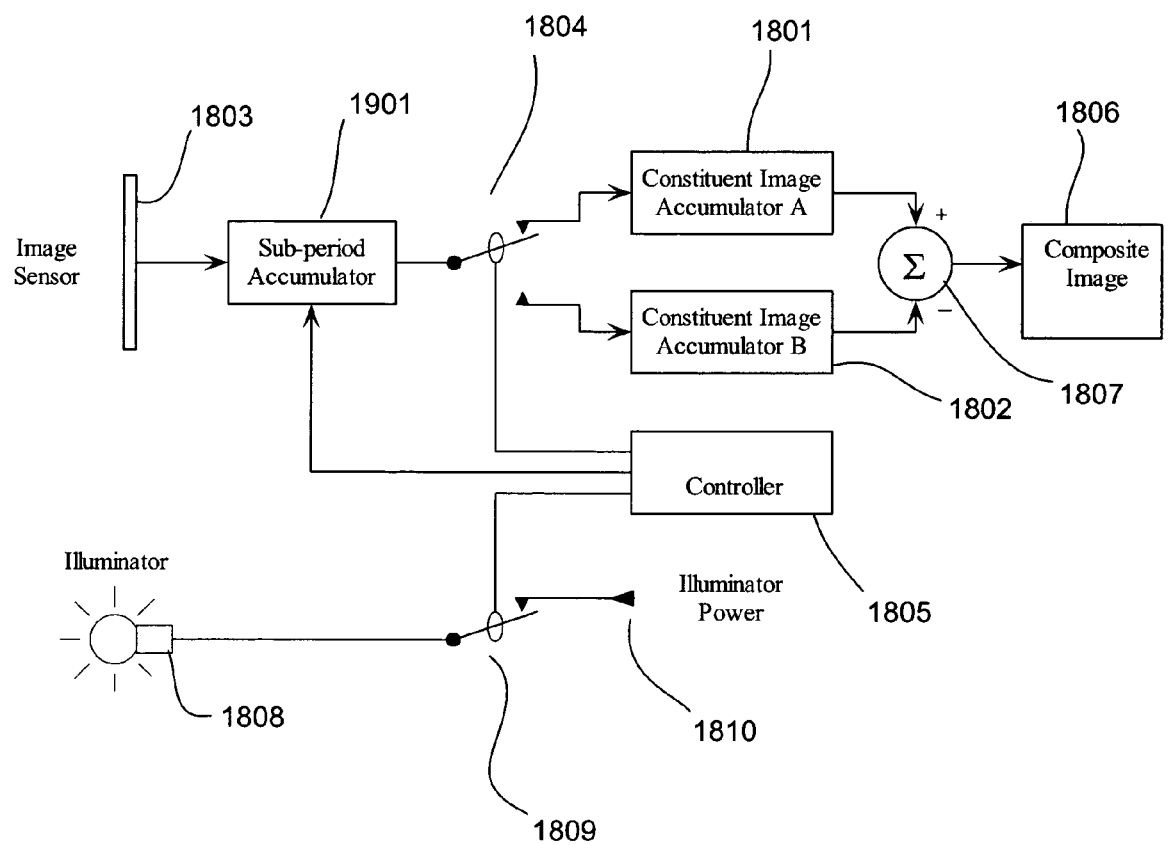
FIG. 19 is a triple accumulator configuration for an image-generation device that uses temporally-interleaved constituent images to achieve motion-clutter minimization, in accordance with an embodiment of the present invention.

FIG. 19 is a triple accumulator configuration for an image-generation device that uses temporally-interleaved constituent images to achieve motion-clutter minimization in accordance with an embodiment of the present invention. The image-generation device contains three image accumulators. Sub-period accumulator 1901 integrates image intensities from image sensor 1803 during each integration sub-period. At the end of each sub-period, the image from sub-period accumulator 1901 is instantaneously transferred and added to either constituent-image accumulator A, 1801, or constituent image accumulator B, 1802 through accumulator-control switch 1804 controlled by controller 1805. The image in sub-period accumulator 1901 is re-initialized to zero by controller 1805 for the next integration sub-period.

During the overall frame exposure period, controller 1805 toggles between A and B states at a high rate. At the end of each A sub-period, the sub-period accumulator's charge is transferred to accumulator A, 1801, and at the end of each B sub-period, the sub-period accumulator's charge is transferred to accumulator B, 1802. At the end of the overall frame exposure period, accumulators A and B each contain a temporally-interleaved constituent image. The image-generation device forms the final, composite output image, 1806, by subtracting the two constituent images with processor 1807.

Controller 1805 also controls the image-generation device's scene illuminator 1808 by controlling switch 1809 between scene illuminator 1808 and scene illuminator power 1810. In one embodiment, the control signal to scene illuminator-control switch 1809 is identical to the control signal to accumulator accumulator-control switch 1804. In another embodiment, the control signal to scene illuminator-control switch 1809 is not identical to the control signal to accumulator accumulator-control switch 1804. In both embodiments, however, controller 1805 drives scene illuminator-control switch 1809 in synchronization with accumulator accumulator-control switch 1804.

Single Accumulator Configuration

Figure 20:
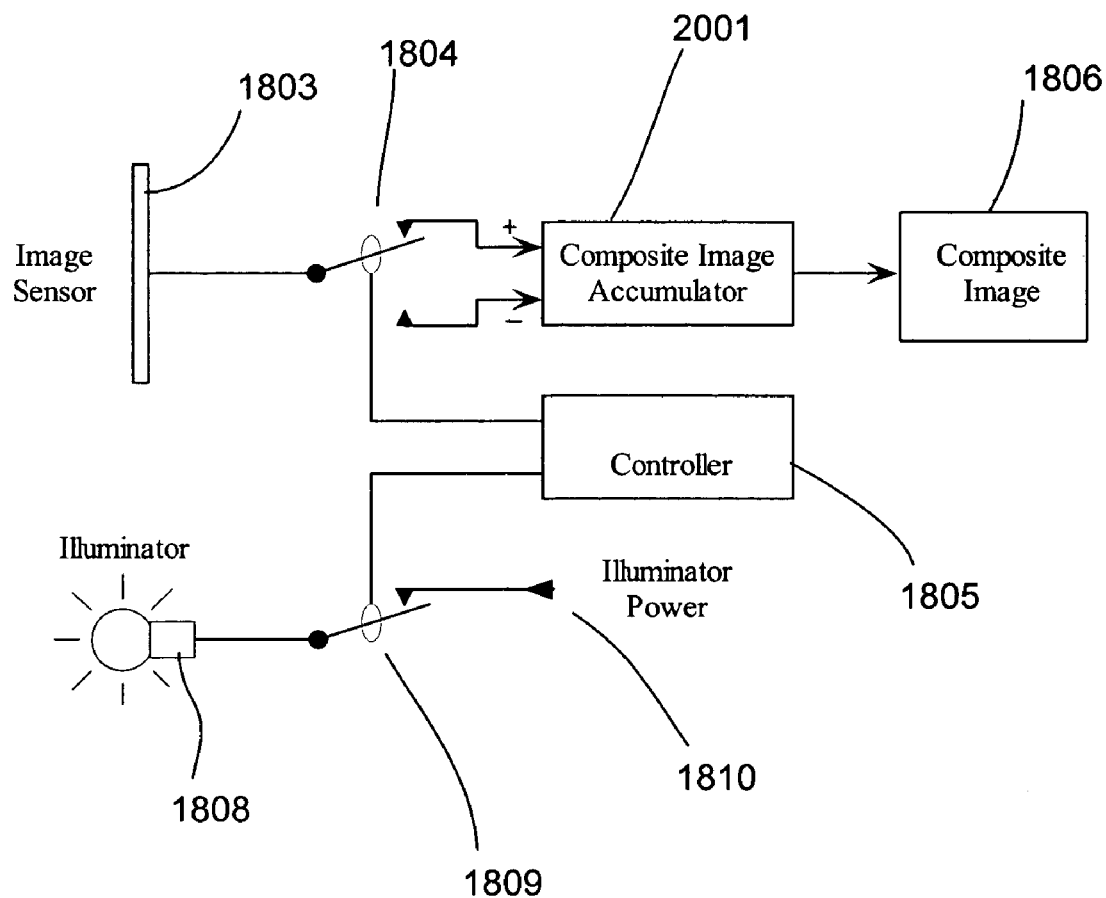
FIG. 20 is a single accumulator configuration for an image-generation device that uses temporally-interleaved constituent images to achieve motion-clutter minimization, in accordance with an embodiment of the present invention.

FIG. 20 is a single accumulator configuration for an image-generation device that uses temporally-interleaved constituent images to achieve motion-clutter minimization in accordance with an embodiment of the present invention. The image-generation device contains composite image accumulator 2001 for forming an image. Accumulator 2001 is designed such that the output from image sensor 1803 may be added to or subtracted from the accumulated image. Prior to the overall frame exposure period, composite image accumulator 2001 is reset to an initial value, which may, for example, be zero or a nominal (gray) level. The initialization of composite image accumulator 2001 to a reference gray level may be used to prevent portions of the image from going below zero when the sub-period image is subtracted from the composite image.

During the overall frame exposure period, controller 1805 toggles accumulator-control switch 1804 between A and B states at a high rate, and switches the input state of accumulator 2001 between addition and subtraction accordingly. At the end of the overall frame exposure period, composite image accumulator 2001 contains the composite image 1806. Controller 1805 also controls the image-generation device's scene illuminator 1808 by controlling switch 1809 between scene illuminator 1808 and scene illuminator power 1810. In one embodiment, the control signal to scene illuminator-control switch 1809 is identical to the control signal to accumulator accumulator-control switch 1804. In another embodiment, the control signal to scene illuminator-control switch 1809 is not identical to the control signal to accumulator accumulator-control switch 1804. In both embodiments, however, controller 1805 drives scene illuminator-control switch 1809 in synchronization with accumulator accumulator-control switch 1804.

Series Accumulator Configuration

Figure 21:
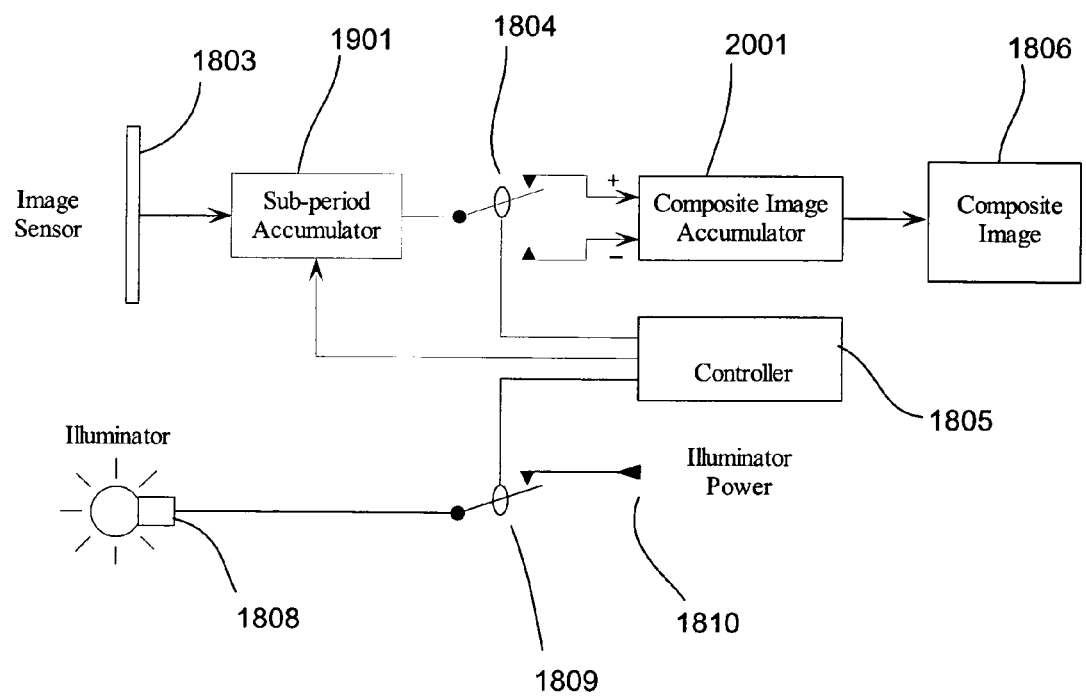
FIG. 21 is a series accumulator configuration for an image-generation device that uses temporally-interleaved constituent images to achieve motion-clutter minimization, in accordance with an embodiment of the present invention.

FIG. 21 is a series accumulator configuration for an image-generation device that uses temporally-interleaved constituent images to achieve motion-clutter minimization in accordance with an embodiment of the present invention. The image-generation device contains two image accumulators. Sub-period accumulator 1901 integrates image intensities from image sensor 1803 during each integration sub-period. At the end of each sub-period, the image from sub-period accumulator 1901 is instantaneously transferred to composite image accumulator 2001, where the image from the sub-period accumulator 1901 may be either added to or subtracted from the charge previously accumulated in composite image accumulator 2001. The image in sub-period accumulator 1901 is re-initialized to zero by controller 1805 for the next integration sub-period.

Prior to the overall frame exposure period, composite image accumulator 2001 is reset to an initial value, which may be zero or a reference gray level. The initialization of composite image accumulator 2001 to a reference gray level may be used to prevent portions of the image from going below zero when the sub-period image is subtracted from the composite image. During the overall frame exposure period, a controller 1805 toggles accumulator-control switch 1804 between A and B states at a high rate. At the end of each A sub-period, the sub-period accumulator's charge is added to composite image accumulator 2001, and at the end of each B sub-period, the sub-period accumulator's image is subtracted from composite image accumulator 2001. At the end of the overall frame exposure period, composite image accumulator 2001 contains composite image 1806.

Controller 1805 also controls the image-generation device's scene illuminator 1808 by controlling switch 1809 between scene illuminator 1808 and scene illuminator power 1810. In one embodiment, the control signal to scene illuminator-control switch 1809 is identical to the control signal to accumulator accumulator-control switch 1804. In another embodiment, the control signal to scene illuminator-control switch 1809 is not identical to the control signal to accumulator accumulator-control switch 1804. In both embodiments, however, controller 1805 drives scene illuminator-control switch 1809 in synchronization with accumulator accumulator-control switch 1804.

Synchronizing to External Illumination Signals

In the above embodiments of image-generation device configurations, the controller is described (and shown) as generating the signal that controls the camera's illuminator. In other embodiments, however, the illuminator may be controlled by a source outside the camera. In this case, the controller may be configured to take an externally-generated illuminator-synchronization signal as an input, and to generate the accumulator-switch-control signal in response to it (as opposed to generating the illuminator-control signal in response to the internally generated accumulator-control switch signal).

Access to Constituent Images

If it is desired to recover the constituent A and/or B images from the image-generation device, either the Double-Accumulator or Triple-Accumulator provide access to the constituent A and B images.

Considerations of Image Dynamic Range

In image-subtraction applications, the intensity range (i.e., dynamic range) of a subtracted image is often significantly less than the intensity range of either of the two constituent images. In ambient-light-cancellation applications, for example, the ambient light may be significantly stronger than the image-generation device's own controlled light (as illustrated in the above examples), and the difference image (i.e. the ambient-light-cancelled image) may be relatively weak with respect to the two raw ambient-lighted images. Using conventional non-temporally-interleaved collection of the two images to be subtracted (or using the Double-Accumulator or Triple-Accumulator embodiments of the temporally-interleaved image-generation devices described above), the accumulators used in collecting the constituent raw images must contain proportionately more dynamic range than is required in the composite output image.

When using temporally-interleaved image-subtraction, however, the amount of light received during each sub-period interval is reduced by a factor of the number of A/B sub-pairs, and the required dynamic range of each sub-period image is proportionately reduced. In the above-described single-accumulator or serial-accumulator embodiments of a temporally-interleaved image-subtraction image-generation device, neither of the two constituent images A and B is integrated separately and explicitly, so high-dynamic-range image accumulators are not required. For image-subtraction applications where the dynamic range of the constituent images being subtracted significantly exceeds the required dynamic range of the composite subtracted image, the single-accumulator and serial-double-accumulator embodiments are preferred over the double-accumulator and triple-accumulator embodiments, in that they do not require high-dynamic-range accumulators for the A and B sub-images.

Constituent Image Accumulators with Add/subtract Capabilities

An embodiment of the series accumulator configuration (FIG. 21) is designed to either add or subtract an incoming input image. The image accumulators and subtraction mechanism is implemented in much the same manner as a combination of a charge pump and an inverse charge pump. The charge pump operates much as the bucket brigade used to read the image out. The inverse charge pump uses an intermediate capacitor and switches to subtract charge from the accumulator, in much the same manner that a voltage inverter would.

Figure 22:
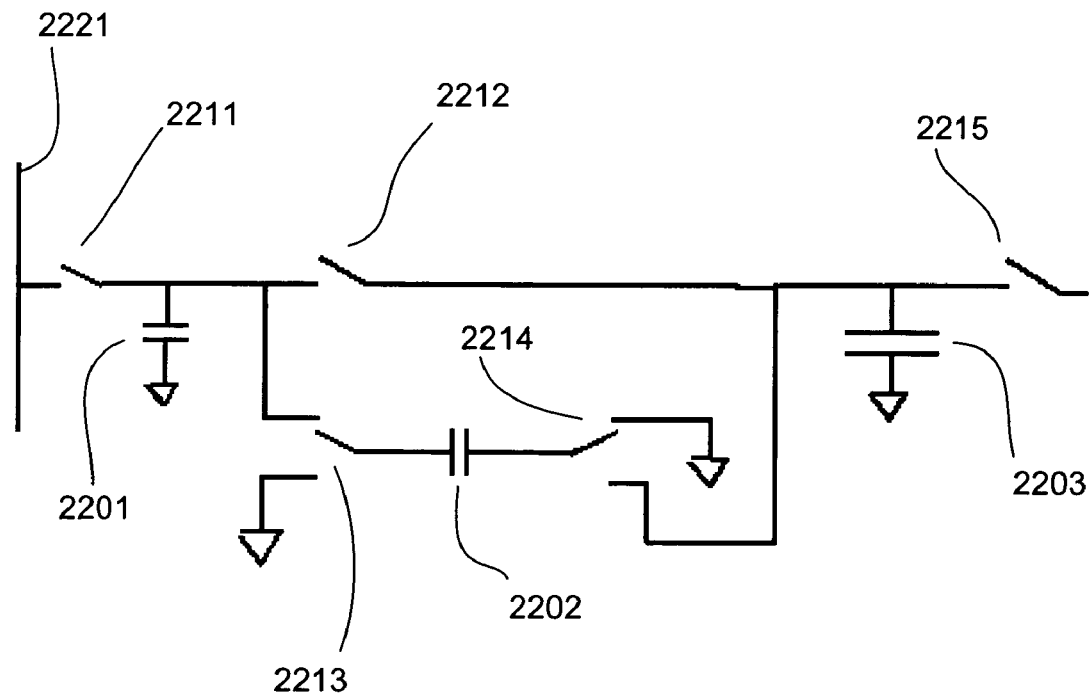
FIG. 22 is an exemplary circuit for a single pixel series accumulator configuration, in accordance with an embodiment of the present invention.

The circuit shown in FIG. 22 is an embodiment of the single composite image accumulator with a sub-period accumulator circuit for a single pixel. Capacitor 2201 acts as the sub-period accumulator. Capacitor 2203 acts as the composite image accumulator. Capacitor 2202, in combination with switches 2213 and 2214, act as the image subtraction mechanism.

At the end of accumulation period A, switch 2211 is closed and the image charge is moved from image sensor 2221 to sub-period accumulator 2201. Switch 2211 is then opened and switch 2212 is closed, and the charge is added to the charge in composite image accumulator 2203.

At the end of accumulation period B, switch 2211 is closed and the image charge is moved from image sensor to the aub-period accumulator 2201. Switch 2211 is opened. Switches 2213 and 2214 are closed to their upper contacts. The charge moves from the sub-period accumulator 2201 to capacitor 2202. After the charge has moved, switch 2213 and 2214 are closed to their lower contacts. The charge on 2202 drains from capacitor 2202. This pulls an equivalent amount of charge from the composite image accumulator 2203.

At the end of the frame period, switch 2215 is closed and the composite image accumulator is read out.

This is an over simplification of the circuit since the charge must be moved, rather than simply shared across the capacitors. However, it illustrates how a charge pump, similar to a charge pump used for a voltage inverter, can be used to implement the image subtraction circuit.

Synchronizing Camera Illumination with Image Capture

Often, in image-subtraction photography such as the ambient-light-cancellation application, the camera has a single illuminator, the illuminator is on during the collection of one of the constituent images and off during the other (e.g., on during phase A and off during phase B), and the exposure times $\Delta t_A$ and $\Delta t_B$ are equal. In the more general case of image-subtraction, however, the camera may employ multiple illuminators, alternative illuminators may be activated during either or both of the A and B phases, the illumination periods need not be timed to correspond exactly with the A and B phases, and the shutter periods for the two phases need not be equal in length.

Multiple illuminators, for example, may be used to enhance color contrast in a scene. In this case, the camera may illuminate the scene with one color (or more of one color) during one phase, and illuminate the scene with another color (or more of that color) during the second phase.

The proportions of the alternative lighting contained in the final composite image may also be controlled by varying the relative durations of the two exposure periods $\Delta t_A$ and $\Delta t_B$. When controlling ambient light content in a composite image, for example, it may be desirable to suppress only a portion of the ambient light. In this case, the relative durations of exposure periods may be adjusted to provide a composite image that represents the ambient image alone, the camera-illuminated image alone, or any combination in between. In fact, if the exposure period for the ambient-alone constituent image is longer than the ambient-plus-camera-illuminator constituent image, the effect of ambient light in the composite image may even be reversed.

Other Means of Combining Constituent Images

In addition to subtracting constituent images, it may be useful to combine images in other ways. For example, an image taken with the scene illuminated by a single color may be added to an image taken with normal illumination to enhance that color in the scene. Temporally-interleaved images may then be added as well as subtracted.

Exemplary Implementation of the Present Invention: Motion-clutter Suppression in Video Eyetracking One important use of ambient light canceling (ALC) photography (i.e., subtracting two successive images, where one image is taken with controlled illumination and the other is taken without the controlled illumination) is in the field of video eyetracking. Typically, a video eyetracker uses an illuminator such as a light-emitting diode (LED) to illuminate the eye, and it calculates the orientation of the eye by measuring the location(s) of the pupil and/or the corneal reflection of the illuminator off the corneal surface of the eye. From the point of view of the eyetracker's logic that analyzes the image of the eye, light from other (ambient) sources adds 'noise' to the camera's idealized image of the eye. For example, the camera might 'see' the reflection of a window or a lamp on the surface of the cornea. With reflections of this type superimposed on the camera's image of the eye, the image-processing functions often have difficulty detecting and measuring the relevant features of the eye. In this case, ambient-light-cancellation can be used to preserve the desired, well-controlled image of the eye created by the camera's illuminator, despite the existence of considerable ambient light.

In addition, it is desirable to have an eyetracker function in a similar manner both indoors and outdoors. The ambient light varies tremendously between these environments. It is not possible to overcome the ambient infrared light by increasing the illumination due to eye safety limitations. Therefore, it is necessary to use ambient light cancellation methods or redesign the system. Because of the dynamic range requirements, the preferred embodiment of the system should be either the single accumulator configuration or the series accumulator configuration.

The problem of eye motion compounds the ambient light problem in video eyetracking. When the user moves his head, the eye moves within the camera's field of view, and the resulting motion clutter from the ALC's image subtraction severely degrades the camera's image of the eye. The use of temporally-interleaved constituent images significantly reduces motion clutter in the subtracted image, thus permitting more accurate and robust eyetracking, even in the presence of both ambient light and head motion.

Systems and methods in accordance with an embodiment of the present invention disclosed herein can advantageously minimize the magnitude of motion clutter in dynamic camera scenes. Systems employing temporally-interleaved image-subtraction significantly reduce the magnitude of motion clutter and have no adverse effect on the desired ambient-light cancellation of static images. Embodiments containing either double accumulator or triple accumulator configurations allow constituent images to be recovered. Embodiments containing either single accumulator or series accumulator configurations do not require high-dynamic-range accumulators for the collection of sub-images. Temporally-interleaved image-subtraction is particularly well suited for reducing the effects of ambient light and head motion in video eyetracking applications.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. An apparatus for generating eye images including an image-generation apparatus comprising:
   an image sensor that generates an output from a physical wave input; two constituent-image accumulators;
   an accumulator-control switch that directs the image-sensor output to either one of the two constituent-image accumulators;
   a controller for the accumulator-control switch that toggles the image sensor output between the two constituent-image accumulators over multiple sub-periods within an overall frame-capture period, wherein the sub-periods of the constituent images are temporally interleaved; and
   a processor that subtracts the constituent images from the two constituent-image accumulators to form a composite image.

2. The apparatus according to claim 1, further comprising at least one scene illuminator, wherein the at least one scene illuminator is connected to its power source through a scene illuminator-control switch.

3. The apparatus according to claim 2, wherein the scene illuminator-control switch is synchronized with the accumulator-control switch.

4. The apparatus according to claim 3, wherein the scene illuminator-control switch is synchronized with the accumulator-control switch by the controller's generating an illuminator-control signal in response to the accumulator-control switch signal.

5. The apparatus according to claim 4, wherein illuminator-control signal generated by the controller comprises the accumulator-control switch signal.

6. The apparatus according to claim 4, wherein illuminator-control signal generated by the controller does not comprise the accumulator-control switch signal.

7. The apparatus according to claim 3, wherein the scene illuminator-control switch is synchronized with the accumulator-control switch by the controller's generating the accumulator-control switch signal in response to an externally generated illuminator-control signal.

8. An apparatus for generating eye images including an image-generation apparatus comprising:
   an image sensor that generates an output from a physical wave input;
   a sub-period accumulator that accumulates the image-sensor output within individual sub-frame periods;
   two constituent-image accumulators that accumulate constituent images comprised of different sets of sub-images from the sub-period accumulator;
   an accumulator-control switch that directs the output from the sub-period accumulator to be added to either one of the constituent-image accumulators;
   a controller, wherein the controller initializes the sub-period accumulator before each sub-period and generates an accumulator-control switch signal that toggles the output of the sub-period accumulator between the two constituent-image accumulators over multiple sub-periods within an overall frame-capture period, wherein the sub-periods of the constituent images are temporally interleaved; and
   a processor that subtracts the constituent images from the two constituent-image accumulators to form a composite image.

9. The apparatus according to claim 8, further comprising at least one scene illuminator, wherein the at least one scene illuminator is connected to its power source through a scene illuminator-control switch.

10. The apparatus according to claim 9, wherein the scene illuminator-control switch is synchronized with the accumulator-control switch.

11. The apparatus according to claim 10, wherein the scene illuminator-control switch is synchronized with the accumulator-control switch by the controller's generating an illuminator-control signal in response to the accumulator-control switch signal.

12. The apparatus according to claim 11, wherein illuminator-control signal generated by the controller comprises the accumulator-control switch signal.

13. The apparatus according to claim 11, wherein illuminator-control signal generated by the controller does not comprise the accumulator-control switch signal.

14. The apparatus according to claim 10, wherein the scene illuminator-control switch is synchronized with the accumulator-control switch by the controller's generating the accumulator-control switch signal in response to an externally generated illuminator-control signal.

15. An apparatus for generating eye images including an image-generation apparatus comprising;
- an image sensor that generates an output from a physical wave input;
- an image accumulator that forms a composite image;
- an accumulator-control switch that controls whether the image-sensor output is added to or subtracted from the image accumulator; and
- a controller for the accumulator-control switch that toggles between addition and subtraction over multiple sub-periods within an overall frame-capture period, wherein the sub-periods of the constituent images are temporally interleaved.

16. The apparatus according to claim 15, further comprising at least one scene illuminator, wherein the at least one scene illuminator is connected to its power source through a scene illuminator-control switch.

17. The apparatus according to claim 16, wherein the scene illuminator-control switch is synchronized with the accumulator-control switch.

18. The apparatus according to claim 17, wherein the scene illuminator-control switch is synchronized with the accumulator-control switch by the controller's generating an illuminator-control signal in response to the accumulator-control switch signal.

19. The apparatus according to claim 18, wherein illuminator-control signal generated by the controller comprises the accumulator-control switch signal.

20. The apparatus according to claim 18, wherein illuminator-control signal generated by the controller does not comprise the accumulator-control switch signal.

21. The apparatus according to claim 17, wherein the scene illuminator-control switch is synchronized with the accumulator-control switch by the controller's generating the accumulator-control switch signal in response to an externally generated illuminator-control signal.

22. An apparatus for generating eye images including an image-generation apparatus comprising:
- an image sensor that generates an output from a physical wave input;
- a sub-period accumulator that accumulates the image-sensor output within individual sub-frame periods;
- a composite-image accumulator that accumulates a composite image comprised of added and subtracted sets of sub-images;
- an accumulator-control switch that directs the output from the sub-period accumulator to be added to or subtracted from the composite-image accumulator; and
- a controller that initializes the sub-period accumulator before each sub-period and generates an accumulator-control switch signal that toggles between addition and subtraction over multiple sub-periods within an overall frame-capture period, wherein the sub-periods of the constituent images are temporally interleaved.

23. The apparatus according to claim 22, further comprising at least one scene illuminator, wherein the at least one scene illuminator is connected to its power source through a scene illuminator-control switch.

24. The apparatus according to claim 23, wherein the scene illuminator-control switch is synchronized with the accumulator-control switch.

25. The apparatus according to claim 24, wherein the scene illuminator-control switch is synchronized with the accumulator-control switch by the controller's generating an illuminator-control signal in response to the accumulator-control switch signal.

26. The apparatus according to claim 25, wherein illuminator-control signal generated by the controller comprises the accumulator-control switch signal.

27. The apparatus according to claim 25, wherein illuminator-control signal generated by the controller does not comprise the accumulator-control switch signal.

28. The apparatus according to claim 24, wherein the scene illuminator-control switch is synchronized with the accumulator-control switch by the controller's generating the accumulator-control switch signal in response to an externally generated illuminator-control signal.

29. A method for generating eye images including a method for suppressing motion clutter comprising:
- accumulating a first image during a first sub-period;
- accumulating a second image during a second sub-period;
- accumulating a third image during a third sub-period;
- accumulating a fourth image during a fourth sub-period;
- adding the first image to the third image to derive the first sub-composite image;
- adding the second image to the fourth image to derive the second sub-composite image; and
- subtracting the second sub-composite image from the first sub-composite image to form a composite image,
- wherein the second sub-period is between the first and third sub-periods, and the third sub-period is between the second and fourth sub-periods.

30. The method according to claim 29, further comprising providing illumination during the first and third sub-periods.

31. The method according to claim 29, wherein the first sub-period is of a different duration than the second sub-period.

32. A method for generating eye images including a method for suppressing motion clutter comprising:
- capturing a first image during a first sub-period;
- capturing a second image during a second sub-period;
- calculating a first sub-composite image from the difference between the first image and second image;
- capturing a third image during a third sub-period;
- calculating a second sub-composite image from the difference between the third image and the first sub-composite image;
- capturing a fourth image during a fourth sub-period; and
- calculating a composite image from the difference between the fourth image and the second sub-composite image.

33. The method according to claim 32, further comprising providing illumination during the first and third sub-periods.

34. The method according to claim 32, wherein the first sub-period is of a different duration than the second sub-period.

* * * * *